H. G. SICKELS.
Vapor Burner.
No. 734. Reissued May 31, 1859.
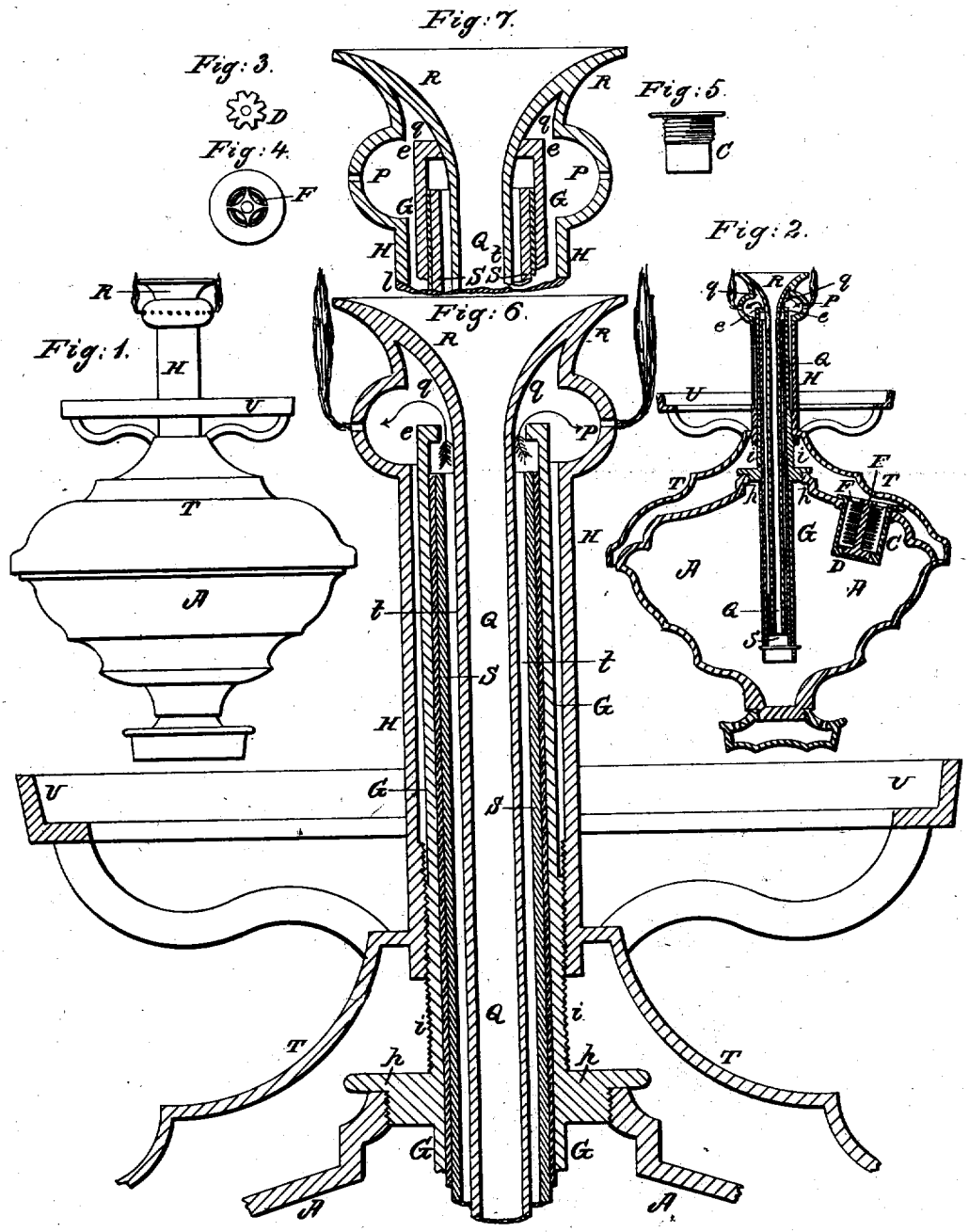
Witnesses:
Henry Howson
Horace See.
Inventor:
Geo H Bechter.
N. PETERS. Photo-Lithographer, Washington, D. C.

UNITED STATES PATENT OFFICE.

H. G. SICKEL, OF PHILADELPHIA, PENNSYLVANIA, ASSIGNOR, BY MESNE ASSIGNMENTS, TO GEORGE H. BECHTEL.

IMPROVEMENT IN GAS-LAMPS.

Specification forming part of Letters Patent No. 6,624, dated August 7, 1849; Reissue No. 734, dated May 31, 1859.

*To all whom it may concern:*

Be it known that I, GEORGE H. BECHTEL, of the city and county of Philadelphia, and State of Pennsylvania, have, by mesne assignments, become the owner of all the right, title, and interest in an Improvement in Gas-Lamps, for which Letters Patent of the United States were granted to HORATIO G. SICKEL, of the city of Philadelphia, on the 7th day of August 1849; that he now believes the said patent to be inoperative and invalid by reason of a defective specification; and I do hereby declare that the following is a full, clear, and exact description of the invention, reference being had to the accompanying drawings, and to the letters of reference marked thereon.

The invention consists, first, in a mode of regulating the admission of gas to the burner, by forming a valve in the latter and a valve-seat on the tube which contains the wick; second, in a safety-valve, described hereinafter, for allowing the excess of gas to escape from the reservoir containing the fluid; third, in a shield or guard arranged to cover and overhang the reservoir in combination with the gas-generator and burner; fourth, in combining the gas-generator, the guard, and the ring for holding the glass shade in a single piece, so that the whole may ascend and descend simultaneously.

On reference to the accompanying drawings, which form a part of this specification, Figure 1 is an exterior view of H. G. Sickel's improved gas-lamp; Fig. 2 a sectional view; Figs. 3, 4, and 5, detached views illustrating the method of constructing the safety-valve; Fig. 6, an enlarged sectional view of the burner; Fig. 7, a part of Fig. 6, showing the position of the part when the gas is cut off from the burner.

Similar letters refer to similar parts throughout the several views.

A is the reservoir for containing the fluid, from which the ignitible gas or vapor is generated, and into the top of this reservoir is screwed the hollow stopper C, the bottom of which forms the seat for the valve D. The stem E of the latter passes through and is guided by a hole in a cross-bar on the top of the hollow stopper, and between this cross-bar and the top of the valve intervenes a spiral spring, F, which serves to maintain the valve tight on its seat when not raised by the undue pressure in the reservoir. Into the top of the latter is secured the collar *h*, which forms a part of the tube G, one portion of which projects downward into the fluid contained in the reservoir, the other portion projecting upward and terminating within the burner P, which consists of a chamber of a spherical or other suitable form situated on the top and forming a part of the outer tube, H, the lower end of which has an internal screw adapted to the screw cut on the tube G at *i*. The tube H carries the shield or guard I, which covers and overhangs the top of the reservoir A. The tube also carries the ring U, which serves the double purpose of supporting the glass shade of the lamp and turning the outer cylinder round when it is desirable to increase or diminish the flame. The gas-chamber P is pierced at intervals with small holes, through which gas escapes and at which it is ignited. The chamber is surmounted with a cap or button, R, which may be of the trumpet form illustrated in the drawings, or of a spherical, conical, or other form capable of producing the desired effect.

To the cap or button R is secured the internal pipe, Q, which extends downward into the fluid of the reservoir, and at the junction of this tube with the cap a valve is formed at *q q* of such a diameter as to fit the top of the tube G when the outer tube, H, is screwed down, the top of the tube having an internal flange, *e*, which forms the seat for the valve. The wick *t* bears directly against the inside of the tube G, and is wrapped round a reticulated tube, S, between which and the innermost tube, Q, a narrow space intervenes. This tube Q is closed at the lower end, and the reticulated tube S rests on a pin passing transversely through the lower end of the tube G.

Operation: The volatile liquid, which is generally composed of alcohol and spirits of turpentine, and from which the gas is generated, is poured into the reservoir through the opening in which the tubular stopper C is screwed. The outer tube, H, is then adjusted on the tube G by turning the ring U until there is a sufficient opening between the valve *q* and its seat *e*, on the top of the tube G, to allow the desired amount of gas to pass into the hollow chamber P. A small quantity of the spirit is then poured into the interior of the tube Q through the opening in the cap or button R′, and this spirit is ignited to serve as a temporary light for imparting the necessary heat to the cup and tube Q, to generate vapor in the cylinder G for supplying the burner P. This temporary light may be extinguished after the gas passing from the burner is ignited, as the lights maintain the cap or button R, and consequently the tube Q, at a heat sufficient to generate the gas in the tube G without aid from any extraneous light. The vapor rising in the tube G passes upward and through the annular space between the valve *q* and its seat *e* into the chamber P, from whence it issues through any convenient number of radial orifices, so as to produce a number of jets, which, when ignited, form a flame similar to that of ordinary gas. Should too much vapor issue between the valve and its seat, the annular opening between the two may be diminished by screwing down the outer tube, H, and when the lamp has to be extinguished the outer tube may be screwed down so far that its valve *q* shall bear tight on its seat, and effectually obstruct the further exit of gas from the tube G. The guard or shield T prevents the possibility of any vapor that might chance to escape at the joints becoming ignited by the flame from the burner. It likewise adds to the beauty of the lamp, and conceals the stopper and other projections. Should there be too great pressure of vapor in the reservoir, the valve D will rise from its seat, contract the spiral spring, and let out the vapor through the openings at the top until the pressure is so far reduced as to permit the spring to reclose the valve. By the use of this valve all danger of explosion from excessive pressure is obviated, and the vapor that escapes between the valve and its seat will pass below the lower edge of the guard T and be condensed without danger of igniting.

I do not claim as the invention of Horatio G. Sickel a generating tube and vapor-burner separately considered; but

I claim as his invention and improvement in gas-generating fluid-lamps—

1. Forming a valve within the adjustable gas-chamber P, and a seat for the said valve on the tube which contains the wick *t*, so as to regulate and extinguish the light when required, whether the said valve be made and arranged in the manner described, or other modes substantially the same, by which similar results may be produced.

2. The employment of the safety-valve C D E, in combination with the guard T, constructed substantially as described.

3. The guard T, in combination with the combined burner and generator, arranged and operating in the manner and for the purpose set forth.

4. Combining the generator Q R, burner P, ring U, and guard T in a single piece, made to ascend and descend simultaneously in the manner and for the purpose substantially as herein set forth.

In testimony whereof I have signed my name to this specification in the presence of two subscribing witnesses.

GEO. H. BECHTEL.

Witnesses:

HENRY HOWSON,

CHARLES D. FREEMAN.